United States Patent
Takasaki

(10) Patent No.: US 9,338,329 B2
(45) Date of Patent: May 10, 2016

(54) IMAGE PROCESSING INCLUDING COLOR CONVERSION FOR A PRINTED IMAGE

(71) Applicant: CANON KABUSHIKI KAISHA, Tokyo (JP)

(72) Inventor: Tetsuhide Takasaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/592,275

(22) Filed: Jan. 8, 2015

(65) Prior Publication Data

US 2015/0201111 A1 Jul. 16, 2015

(30) Foreign Application Priority Data

Jan. 15, 2014 (JP) ................................. 2014-005212

(51) Int. Cl.
*G06K 1/00* (2006.01)
*H04N 1/60* (2006.01)
*G06F 3/12* (2006.01)

(52) U.S. Cl.
CPC ............ *H04N 1/6097* (2013.01); *G06F 3/1208* (2013.01); *G06F 3/1257* (2013.01); *G06F 3/1285* (2013.01); *H04N 1/603* (2013.01)

(58) Field of Classification Search
None
See application file for complete search history.

(56) References Cited

U.S. PATENT DOCUMENTS

| 6,643,029 B2 * | 11/2003 | Kumada et al. ................. 358/1.9 |
| 7,532,349 B2 * | 5/2009 | Arakawa ..................... 358/1.16 |
| 8,542,405 B2 * | 9/2013 | Fischer et al. ................. 358/1.9 |
| 2012/0206743 A1 * | 8/2012 | Murakami ..................... 358/1.9 |

FOREIGN PATENT DOCUMENTS

JP 2003-110857 A 4/2003

* cited by examiner

*Primary Examiner* — Steven Kau
(74) *Attorney, Agent, or Firm* — Fitzpatrick, Cella, Harper & Scinto

(57) ABSTRACT

There are provided an image processing apparatus that can appropriately update a color profile referred to by an OS when color conversion is performed and/or an output condition associated with the color profile, a controlling method of the image processing apparatus. To achieve this object, in a case where a color profile and/or an output condition associated with the color profile are/is updated, by using the updated information, a color profile referred to by an OS when color conversion is performed and/or an output condition associated with the color profile are/is updated.

19 Claims, 11 Drawing Sheets

```
*cupsICCProfile .GlossyPhoto.300x300dpi/Glossy Photo 300dpi Profile: "GlossyPhoto300.icc"
*cupsICCProfile .GlossyPhoto.600x600dpi/Glossy Photo 600dpi Profile: "GlossyPhoto600.icc"
*cupsICCProfile .CoatedPaper.300x300dpi/Coated Paper 300dpi Profile: "CoatedPaper300.icc"
*cupsICCProfile .CoatedPaper.600x600dpi/Coated Paper 600dpi Profile: "CoatedPaper600.icc"
*cupsICCProfile .PremiumGlossy.300x300dpi/Premium Glossy 300dpi Profile: "PremiumGlossy300.icc"
*cupsICCProfile .PremiumGlossy.600x600dpi/Premium Glossy 600dpi Profile: "PremiumGlossy600.icc"
```

FIG.3A

```
*cupsICCProfile .GlossyPhoto.300x300dpi/Glossy Photo 300dpi Profile: "GlossyPhoto300.icc"
*cupsICCProfile .GlossyPhoto.600x600dpi/My Glossy Photo 600dpi Profile: "MyProfile1.icc"
*cupsICCProfile .CoatedPaper.300x300dpi/Coated Paper 300dpi Profile: "CoatedPaper300.icc"
*cupsICCProfile .CoatedPaper.600x600dpi/Coated Paper 600dpi Profile: "CoatedPaper600.icc"
*cupsICCProfile .PremiumGlossy.300x300dpi/Premium Glossy 300dpi Profile: "PremiumGlossy300.icc"
*cupsICCProfile .PremiumGlossy.600x600dpi/Premium Glossy 600dpi Profile: "PremiumGlossy600.icc"
```

FIG.3B

```
*cupsICCProfile .GlossyPhoto.300x300dpi/Glossy Photo 300dpi Profile: "GlossyPhoto300.icc"
*cupsICCProfile .GlossyPhoto.600x600dpi/Glossy Photo 600dpi Profile: "GlossyPhoto600.icc"
*cupsICCProfile .CoatedPaper.300x300dpi/My Coated Paper 300dpi Profile: "MyProfile2.icc"
*cupsICCProfile .CoatedPaper.600x600dpi/Coated Paper 600dpi Profile: "CoatedPaper600.icc"
*cupsICCProfile .PremiumGlossy.300x300dpi/Premium Glossy 300dpi Profile: "PremiumGlossy300.icc"
*cupsICCProfile .PremiumGlossy.600x600dpi/Premium Glossy 600dpi Profile: "PremiumGlossy600.icc"
```

FIG.3C

```
*cupsICCProfile .GlossyPhoto.300x300dpi/Glossy Photo 300dpi Profile: "GlossyPhoto300.icc"
*cupsICCProfile .GlossyPhoto.600x600dpi/Glossy Photo 600dpi Profile: "GlossyPhoto600.icc"
*cupsICCProfile .CoatedPaper.300x300dpi/Coated Paper 300dpi Profile: "CoatedPaper300.icc"
*cupsICCProfile .CoatedPaper.600x600dpi/Coated Paper 600dpi Profile: "CoatedPaper600.icc"
*cupsICCProfile .PremiumGlossy.300x300dpi/Premium Glossy 300dpi Profile: "PremiumGlossy300.icc"
*cupsICCProfile .PremiumGlossy.600x600dpi/My Premium Glossy 600dpi Profile: "MyProfile3.icc"
```

401 — BASIC CONFIGURATION
402 — PAPER TYPE: GLOSSY PHOTO PAPER
403 — PRINT QUALITY: 600dpi
404 — PRINT
405 — CANCEL

FIG.4B

401 — COLOR MATCHING
406 — TO-BE-USED CMM: OS-PROVIDED CMM
407 — PROFILE: AUTOMATIC
Glossy Photo 600dpi Profile
404 — PRINT
405 — CANCEL

FIG.4C

401 — COLOR MATCHING
406 — TO-BE-USED CMM: OS-PROVIDED CMM
407 — PROFILE: AUTOMATIC
PROFILE UNKNOWN
404 — PRINT
405 — CANCEL

KEY NAME : media

| PAPER TYPE | VALUE |
|---|---|
| COATED PAPER | CoatedPaper |
| GLOSSY PHOTO PAPER | GlossyPhoto |
| PREMIUM GLOSSY PAPER | PremiumGlossy |

KEY NAME : Resolution

| PRINT QUALITY | VALUE |
|---|---|
| 300dpi | 300x300dpi |
| 600dpi | 600x600dpi |

FIG.5

| PRINTING CONDITIONS | | | ASSOCIATED COLOR PROFILE NAME | |
|---|---|---|---|---|
| PAPER TYPE | PRINT QUALITY | ... | FILE NAME | PROFILE NAME |
| GlossyPhoto | 600x600dpi | ... | MyGlossyPhoto600.icc | My Glossy Photo 600dpi Profile |
| ... | ... | | ... | ... |

FIG.6

IMAGE PROCESSING INCLUDING COLOR CONVERSION FOR A PRINTED IMAGE

BACKGROUND OF THE INVENTION

1. Field of the Invention

The present invention relates to an image processing apparatus for performing color conversion on an image outputted from an output device, a controlling method of the image processing apparatus, and a program.

2. Description of the Related Art

Various image input/output devices such as scanners, monitors, and printers have different color reproduction ranges depending on their types and models. For example, in coordinates of L*a*b* representing colors with hue and lightness, a color space (color reproduction range) that can be displayed on a arbitrary monitor and a color space that can be represented on a print medium by a color printer have different sizes and shapes. Accordingly, when a color image displayed on a monitor is outputted by a color printer, color conversion is needed to map colors displayed on the monitor into colors that can be represented by the color printer, so as to reproduce colors as similar as possible to the colors on the monitor. The mapping of the color signals between devices, that is, into which color signals the predetermined color signals are mapped between devices, is generally performed with a look-up table or the like. This is called a color profile.

A color profile is prepared for each device including a monitor or a color printer. Further, since color reproduction ranges vary depending on the type of ink to be used or the type of paper to be used, even when the same color printer is used, a color profile is prepared for each type of ink or paper to be used or for each image quality.

Japanese Patent Laid-Open No. 2003-110857 discloses the configuration of providing a profile management server for storing and managing various color profiles and smoothly updating color profiles among a plurality of printing companies and a plurality of designing and manufacturing companies. According to Japanese Patent Laid-Open No. 2003-110857, when the update registration of the color profile is performed by the personal computer of a printing company, the color profile downloaded to the personal computer of the designing and manufacturing company is updated automatically by the profile management server.

According to the technique disclosed in Japanese Patent Laid-Open No. 2003-110857, when a new color profile to be used is registered, the color profile used by a color conversion portion is replaced with the new color profile. However, a configuration file for using a function associated with a color profile of an operating system (OS) may not be updated. Accordingly, even if an update of the color profile is performed, the color profile after the update may not be used when the OS performs color conversion.

SUMMARY OF THE INVENTION

The present invention has been made to solve the above-described problems. Accordingly, an object of the present invention is to provide an image processing apparatus that can appropriately change a color profile referred to by an OS to perform color conversion or output conditions associated with the color profile and a controlling method of the image processing apparatus.

In a first aspect of the present invention, there is provided an image processing apparatus that can perform color conversion on an image outputted from an output device, the apparatus comprising: a color conversion unit configured to perform the color conversion by a device driver for the output device; a storage unit configured to store a plurality of color profiles referred to by the color conversion unit for performing the color conversion such that the plurality of color profiles are associated with a plurality of output conditions of when the output device outputs an image respectively; and a changing unit configured to, in a case where a color profile and/or an output condition associated with the color profile in the storage unit are/is updated, change a color profile and/or an output condition which are/is referred to by an operating system, by using the updated color profile and/or the updated output condition.

In a second aspect of the present invention, there is provided a controlling method of an image processing apparatus that can perform color conversion on an image outputted from an output device, the apparatus comprising: a color conversion unit configured to perform the color conversion by a device driver for the output device; and a storage unit configured to store a plurality of color profiles referred to by the color conversion unit for performing the color conversion such that the plurality of color profiles are associated with a plurality of output conditions of when the output device outputs an image respectively, the method comprising a changing step for, in a case where a color profile and/or an output condition associated with the color profile in the storage unit are/is updated, changing a color profile and/or an output condition which are/is referred to by an operating system, by using the updated color profile and/or the updated output condition.

Further features of the present invention will become apparent from the following description of exemplary embodiments (with reference to the attached drawings).

BRIEF DESCRIPTION OF THE DRAWINGS

FIGS. 3A to 3D show storage states of a printer driver configuration file;

FIGS. 4A to 4C show exemplary display screens of a print setting dialog;

FIG. 5 shows parameters that can be selected in each combo box;

FIG. 6 is a table showing mapping information between printing conditions and a color profile;

DESCRIPTION OF THE EMBODIMENTS

First Embodiment

Figure 1:
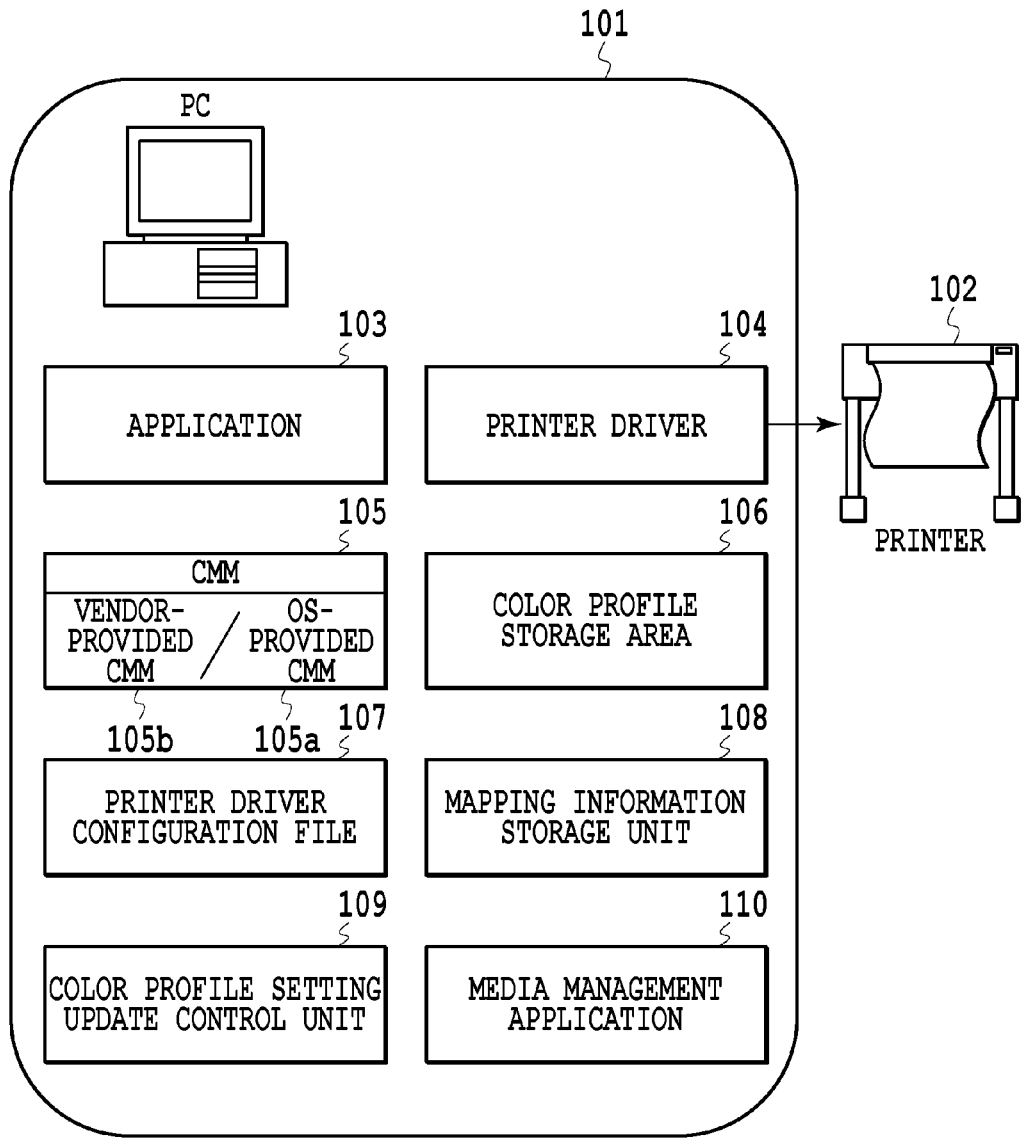
FIG. 1 is a diagram showing a software configuration of a printing system used in a first embodiment.

FIG. 1 is a diagram showing a software configuration of a printing system used in the present embodiment. The printing system of the present embodiment includes a host PC 101 and a printer 102 connected to the host PC 101. A user can use an application 103 installed on the host PC 101 to create an image, and instruct the printer to print the created image.

When such a printing instruction is provided, a printer driver 104 installed on the host PC as the application 103, for example, is activated. The user then sets various items such as the type of paper and an image quality through an UI of the printer driver to issue a print initiation command. The print driver 104 performs various kinds of image processing including color conversion, which will be described later, on image data received from the application 103 according to the set items, and transmits to the printer 102 the image data after converted into a format that can be received by the printer 102. Incidentally, the printer 102 performs printing with ink that is set by the printer driver 104. For example, when the user specifies monochrome printing, ink such as black and gray is used in large quantity as compared to color printing. Further, printing is performed with ink that is set according to a print quality set by the user.

A color management module (CMM) 105 is a mechanism of color conversion intended for color matching between devices such as a monitor of the host PC or the printer 102. In the present embodiment, the CMM 105 includes both of a CMM 105a provided by an operating system (OS) (OS-provided CMM 105a) and a CMM 105b provided by a vendor of the application 103 or the printer driver 104 (vendor-provided CMM 105b). In the printer driver 104, color conversion can be performed on the image data received from the application 103 by using the vendor-provided CMM 105b or the OS-provided CMM 105a.

The CMM 105 refers to a color profile in a multi-dimensional look-up table form for conversion, for example, and performs color conversion on the image created in the application. Multiple types of look-up tables, that is, color profiles, are prepared, in association with the type of device, or if the same device (printer) is used, the types of paper and ink to be used for printing. More specifically, there are provided color profiles associated with print settings (type of paper, print quality, or the like) set by the user and printing conditions such as a kind of printer used for printing.

The color profiles used by the vendor-provided CMM 105b in the printer driver 104 are stored in a color profile storage area 106 provided in an auxiliary storage 205 which will be described later. Meanwhile, the color profiles used by the OS-provided CMM 105a are stored in a printer driver configuration file 107 stored in the auxiliary storage 205 which will be described later. The color profiles associated with paper and ink supported by the printer 102 are installed (stored) in the color profile storage area 106 at the time of installation of the printer driver 104.

A mapping information storage unit 108 stores mapping relations between individual printing conditions and color profiles to be used. When causing the printer to perform printing, the printer driver 104 refers to the mapping information storage unit 108 and selects a color profile associated with printing conditions in the printing from the plurality of color profiles stored in the color profile storage area 106. Then, the selected color profile is transferred to the vendor-provided CMM 105b. The vendor-provided CMM 105b performs color conversion by using the received color profile. Also regarding such mapping information between the printing conditions and the color profile, the printing conditions supported by the printer 102 are stored in the mapping information storage unit 108 when the printer driver 104 is installed. Meanwhile, the mapping of the color profile used by the OS-provided CMM 105a into the printing conditions is stored in the printer driver configuration file 107 in the same memory format as the color profile.

A media management application 110 creates a color profile according to new printing conditions, such as a type of paper not supported by default by the printer, in response to user instructions inputted via the media management application 110 or the UI of the printer driver 104. Then, the media management application 110 stores the created color profile in the color profile storage area 106. In the present embodiment, a color profile setting update control unit 109 performs processing so that the OS-provided CMM 105a can use the color profile newly stored in the color profile storage area 106 for color conversion. More specifically, the color profile setting update control unit 109 adds the new color profile to the printer driver configuration file 107 so that the OS-provided CMM 105a can refer to the new color profile.

Incidentally, in a case where the OS-provided CMM 105a performs color conversion, the OS selects a color profile from a plurality of color profiles stored in the printer driver configuration file 107 based on the printing conditions set in the printer driver 104. Also in a case where a print queue is registered, the OS creates print data according to the content registered in the printer driver configuration file 107.

Figure 2:
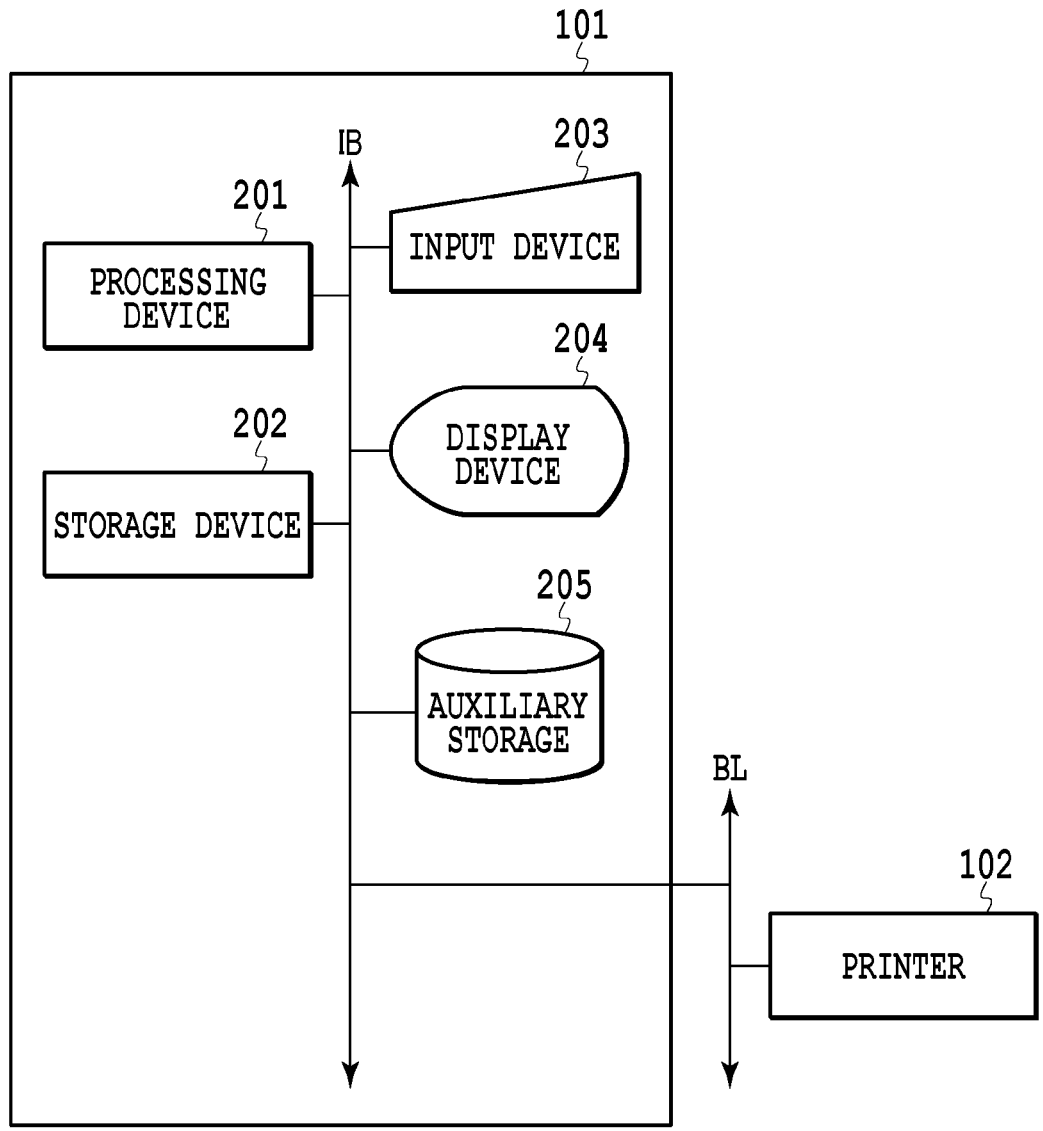
FIG. 2 is a diagram showing a hardware configuration of the printing system that can be used in the first embodiment.

FIG. 2 is a view showing a hardware configuration of a printing system used in the present embodiment. A processing device 201 having a CPU, a storage device 202 such as a RAM, an input device 203 such as a mouse or a key board, a display device 204 such as a CRT or an LCD, and an auxiliary storage 205 such as a hard disk or a magneto-optical disk are connected via an internal bus line IB. A printer 102 is connected externally to the host PC 101 provided therewith, via a bus line BL. Incidentally, the display device 204 and the input device 203 may not be included in the host PC 101 but may be external devices connected to the host PC 101.

Programs associated with various kinds of software described with reference to FIG. 1 are stored in the auxiliary storage 205, and the processing device 201 executes the programs to start the software. More specifically, the processing device 201 controls the entire system while executing various kinds of processing according to the programs of various kinds of software, such as an OS or a printer driver, stored in the auxiliary storage 205 with use of the storage device 202 as a working area.

The display device 204 provides information for a user via the application 103 or the printer driver 104. The user checks the information and inputs various commands and information through the input device 203. The display screens which will be described later with reference to FIGS. 4 and 9 are displayed on the display device 204 by the processing device 201.

FIGS. 3A to 3D show mapping relations between printing conditions and color profiles to be used stored in the mapping information storage unit 108 or the printer driver configuration file 107. Here, there are specified color profiles associated with combinations of two keys associated with printing conditions set via the printer driver 104, that is, <Media> indicating the type of paper and <Resolution> indicating the resolution of an image. By way of example, an explanation will be given with reference to the first line of FIG. 3A. The first line indicates the case where <Media> and <Resolution> are set to <GlossyPhoto> and <300×300 dpi>, respectively. In this case, it is indicated that the color profile with the file name <GlossyPhoto300.icc> is used as a color profile used for color conversion. At the same time, for a user, the name <Glossy Photo 300 dpi Profile> corresponding to the file is displayed via the printer driver. By checking the display, the user can know what color profile is used. The mapping of the printing conditions into the color profile is stored in parallel for each line as shown in FIG. 3A for a combination of <Media> and <Resolution> that can be supported.

Further, according to the file name of the above color profile stored in the mapping information storage unit 108, the vendor-provided CMM 105b can read the color profile from the color profile storage area 106 and use it for color conversion. In the same manner, according to the file name of the color profile stored in the printer driver configuration file 107, the OS-provided CMM 105a uses the color profile stored in the printer driver configuration file 107 for color conversion.

To output an image created by the application 103 from the printer 102, the user provides a printing instruction from the menu or the like of the application 103 and starts a print setting dialog.

FIGS. 4A to 4C show exemplary display screens of the print setting dialog. In a setting menu 401, the user can perform switching between a UI screen provided by the printer driver 104 and a UI screen provided by the OS. In a case where "Basic Configuration" is selected in the setting menu 401, a UI screen for basic configuration provided by the printer driver 104 as shown in FIG. 4A is displayed. In a "Paper Type" combo box 402 on the screen, one of a plurality of paper types supported by the printer can be selected. According to the setting, the <Media> key is set. Meanwhile, in a "Print Quality" combo box 403, one of a plurality of resolutions supported by the printer can be selected. According to the setting, the <Resolution> key is set.

FIG. 5 shows correspondence relation between parameters that can be selected in each combo box and values corresponding to the parameters. If "Coated Paper," "Glossy Photo Paper," and "Premium Glossy Paper" are selected in the "Paper Type" combo box 402, <CoatedPaper>, <GlossyPhoto>, and <PremiumGlossy> are set as the keys, respectively. If "300 dpi" and "600 dpi" are selected in the "Print Quality" combo box 403, <300×300 dpi> and <600×600 dpi> are set as the keys, respectively.

If a print button 404 is clicked in the state of the display shown in FIG. 4A with the keys being displayed in the combo boxes 402 and 403, a color profile associated with the combination of the above-mentioned two keys is selected from a plurality of pieces of mapping information stored in the mapping information storage unit 108. Then, the selected color profile is read from the color profile storage area 106 as a color profile for color conversion, and the vendor-provided CMM 105b performs color conversion using the color profile and creates print data. Note that if a cancel button 405 is clicked, the current job will be cancelled.

Meanwhile, if "Color Matching" is selected in the setting menu 401, an UI screen provided by the OS is set and the display screen is shown by FIG. 4B. In a "To-be-used CMM" combo box 406, one of available two CMMs, that is, either the OS-provided CMM 105a or the vendor-provided CMM 105b of the printer driver 104, can be selected. Here, if the user selects the vendor-provided CMM 105b, it is determined that a color profile provided by the printer driver within the color profile storage area 106 is used, and a profile combo box 407 becomes invalid. Meanwhile, if the user selects the OS-provided CMM 105a, the user can select from "Automatic" color profile setting and "Manual" color profile setting in the profile combo box 407. If "Manual" is selected, the user can select and set a preferable color profile from a plurality of color profiles.

If "Automatic" is selected, the OS first refers to the mapping information shown in FIG. 3A stored in the printer driver configuration file 107, and based on values set to <Media> and <Resolution>, a color profile to be used is determined.

For example, it is assumed that the <Media> key and the <Resolution> key are set to <GlossyPhoto> (glossy photo paper) and <600×600 dpi>, respectively, as the basic configurations explained with reference to FIG. 4A. In this case, if "Automatic" is selected in the profile combo box 407 on the screen shown in FIG. 4B, a file named <GlossyPhoto600.icc> is selected based on the mapping relation shown in FIG. 3A. Then, the name <Glossy Photo 600 dpi Profile> is displayed below the profile combo box 407.

If there is no color profile associated with a combination of the <Media> key and the <Resolution> key in the printer driver configuration file 107, "Profile Unknown" is displayed below the profile combo box 407 as shown in FIG. 4C. Then, as the color profile used by the OS-provided CMM, a color profile prepared by default is set. If the user determines that the color profile set by default is not preferable, the profile combo box 407 is switched to "Manual" so that a preferable color profile can be selected from a plurality of color profiles.

If a print button 404 is clicked under the settings displayed in the combo boxes 406 and 407, the CMM set in the combo box 406 performs color conversion using a color profile set in the combo box 407 and creates print data. Meanwhile, if the cancel button 405 is clicked, the current job and settings will be cancelled.

Settings and use of a new color profile for paper or the like not supported by the printer by default will be described. A color profile associated with new printing conditions can be created by using the media management application 110 via the printer driver. On this occasion, the user inputs on the UI screen of the printer driver the "file name" and the "name" of the color profile to be newly created with a plurality of parameters corresponding to printing conditions including the type of paper. The media management application 110 causes the printer 102 to print a predetermined test pattern in which a plurality of color patches are arranged under the printing conditions corresponding to the inputted parameters. Then, each of the color patches is measured for color by a colorimeter, and from the mapping relation between color signals used for printing each patch and color signals obtained by the measurement, the media management application 110 creates a look-up table for converting the color signals into new color signals. Then, the media management application 110 stores the created look-up table in the color profile storage area 106 with the set file name. The media management application 110 also creates mapping information between printing conditions inputted by the user and the name and file name of a newly created color profile, and stores in the mapping information storage unit 108.

FIG. 6 is a table showing mapping information between printing conditions inputted by a user and a newly created color profile. Here, there are set "Glossy Photo Paper" and "600 dpi" to the type of paper and a print quality, respectively, by the user using the media management application 110. Then, the media management application 110 prints a test pattern on a sheet according to the printing conditions and the colorimeter measures the color of the test pattern on the sheet. Based on the colorimetric result, the media management application 110 creates a color profile. Accordingly, the <Media> key and the <Resolution> key are set to <GlossyPhoto> and <600×600 dpi>, respectively. FIG. 6 shows the case where the file name of the newly created color file is set to <MyGlossyPhoto600.icc> and the "name" is set to <My Glossy Photo 600 dpi Profile>. The combination of the two keys <GlossyPhoto> and <600×600 dpi> are mapped into the file name <MyGlossyPhoto600.icc> and the name <My Glossy Photo 600 dpi Profile> and stored.

Accordingly, since the new color profile is created and the information stored in the color profile storage area 106 and the mapping information storage unit 108 is updated, the vendor-provided CMM 105b can perform color conversion by using the newly created color profile. However, in the circumstances in which the OS-provided CMM 105a is used, the information is not changed yet. If the user selects the OS-provided CMM 105a in this state, and further clicks the print button on the screen shown in FIG. 4B, an image that is color converted using the color profile that is not updated is outputted. In order to avoid such circumstances, in the present embodiment, a color profile setting update control unit 109 is provided. Then, when the new color profile information is updated via the printer driver, the printer driver configuration file 107 used by the OS-provided CMM 105a is also changed. This allows the updated color profile to be properly used even if the OS-provided CMM 105a uses the color profile. Detailed descriptions will be given below.

Figure 7:
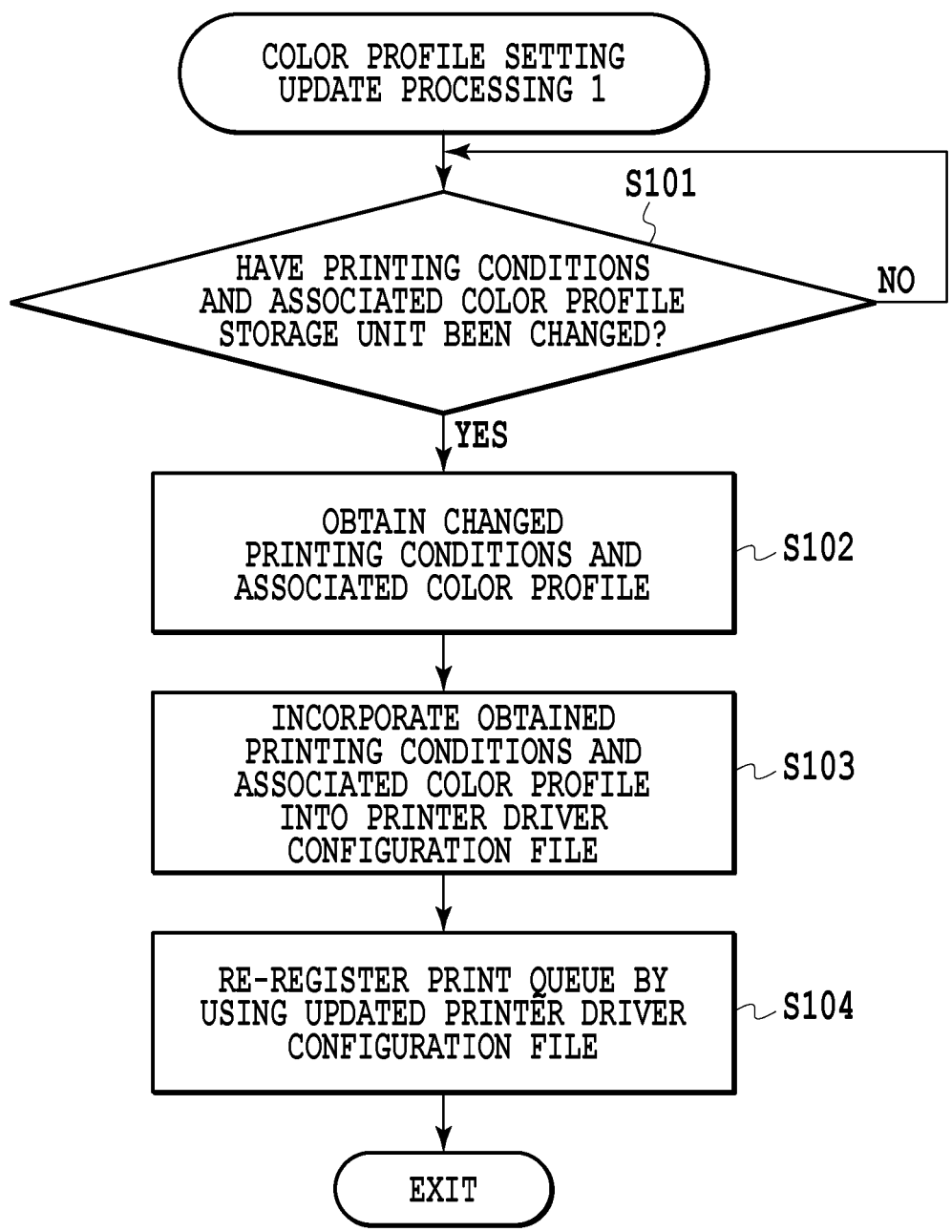
FIG. 7 is a flow chart illustrating an update process in the first embodiment.

FIG. 7 is a flow chart illustrating update processing executed by the color profile setting update control unit 109. This process is executed when the print button 404 is pressed in FIG. 4B and a print queue is registered. Once the process starts, the color profile setting update control unit 109, first in S101, determines whether information in the mapping information storage unit 108 has been updated. When the information update is confirmed, the process proceeds to S102. In a case where the determination in S101 is "No," it is sufficient to use the color profile already stored in the printer driver configuration file 107, and thus the process is finished. Incidentally, in the determination processing in S101, the color profile setting update control unit 109 inquires of the media management application 110 about the update of the color profile. Then, if an update notice is sent from the media management application 110 to the color profile setting update control unit 109, it is determined that the color profile has been updated.

In S102, the color profile setting update control unit 109 searches the mapping information storage unit 108 and obtains mapping information that has been changed or added. Furthermore, a new color profile mapped according to the mapping information is obtained from the color profile storage area 106. The notice in S101 includes mapping information associated with the updated color profile, and the color profile setting update control unit 109 obtains the color profile that is updated according to the mapping information. More specifically, in the above example, the file name and the name associated with the combination of <GlossyPhoto> and <600×600 dpi> have been changed in the mapping information storage unit 108. Therefore, the color profile setting update control unit 109 obtains the new mapping information and thereafter searches the color profile storage area 106 and obtains a data file having the file name <MyGlossyPhoto600.icc>. In the following S103, the color profile setting update control unit 109 incorporates the new mapping information and the new color profile obtained in S102 into the printer driver configuration file 107 and changes the printer driver configuration file 107. FIG. 3B shows the result that the color profile setting update control unit 109 changed the mapping information in the printer driver configuration file 107 in the above example. The file name <MyGlossyPhoto600.icc> and the name <My Glossy Photo 600 dpi Profile> are mapped into the combination of the <GlossyPhoto> key and the <600×600 dpi> key shown in the second line. Incidentally, the mapping information is already updated in the mapping information storage unit 108 by the media management application 110. This means that the mapping information storage unit 108 and the printer driver configuration file 107 are synchronized.

In S104, the color profile setting update control unit 109 uses the updated printer driver configuration file 107, and re-registers a print queue specified by the application 103 to cause the printer 102 to print via the printer driver 104. As a result of this re-registration, a color profile associated with the printing conditions in the updated printer driver configuration file 107 is used for color conversion by the OS-provided CMM.

A method of re-registration uses a registration command of a print queue prepared by the OS. Further in S104, the color profile setting update control unit 109 uses a delete command of a print queue prepared by the OS to delete the print queue registered when the process in FIG. 7 starts. In a case where the print driver 104 is in use by other applications, the user is notified that the application in use should be temporarily ended or the re-registration of the print queue is delayed until the next restart of the system. When the print queue can be normally registered, the color profile setting update control unit 109 uses a registration command of the print queue prepared by the OS, to re-register the print queue by using the updated printer driver configuration file 107. The present processing is finished.

As a result of the process in S103 shown in FIG. 7, the updated printer driver configuration file 107 as shown in FIG. 3B is used next time in a case where the user selects the OS-provided CMM when printing an image created in the application 103 via the printer driver 104. Accordingly, color conversion can be performed by using a new color profile added by the media management application 110. That is, in a case where the settings as shown in FIGS. 4A and 4B are selected in each combo box, the OS-provided CMM uses a color profile stored with the file name <My Glossy Photo 600 dpi Profile> to perform color conversion. As a result, even when the OS-provided CMM is used, the user can perform appropriate color conversion by using the color profile that is newly created for the user himself. Accordingly, whichever CMM is used, the user only needs to set a preferable color profile once via the printer driver, so that a color profile changed by the media management application 110 is used to perform color conversion.

Furthermore, the following can be achieved as a result of the process in S104 shown in FIG. 7: even if the user himself does not re-register a print queue after providing a printing instruction, in a case where a color profile associated with the printing conditions has been updated in the color profile storage area 106, the color profile can be used for the printing.

Second Embodiment

In the present embodiment, a description will be given of the configuration in which a user selects an arbitrary color profile with respect to printing conditions and adds the color profile to a printer driver configuration file 107. Other configurations shown in FIG. 1 apply to the present embodiment like the first embodiment. In the present embodiment, a color profile setting update control unit 109 is activated at a predetermined timing as follow. That is, the color profile setting update control unit 109 is activated when the user starts up a media management application 110 to create a new color profile, when the user clicks a button provided on a UI of a printer driver, when the user provides a printing instruction on the screen shown in FIG. 4B, and the like.

Figure 8:
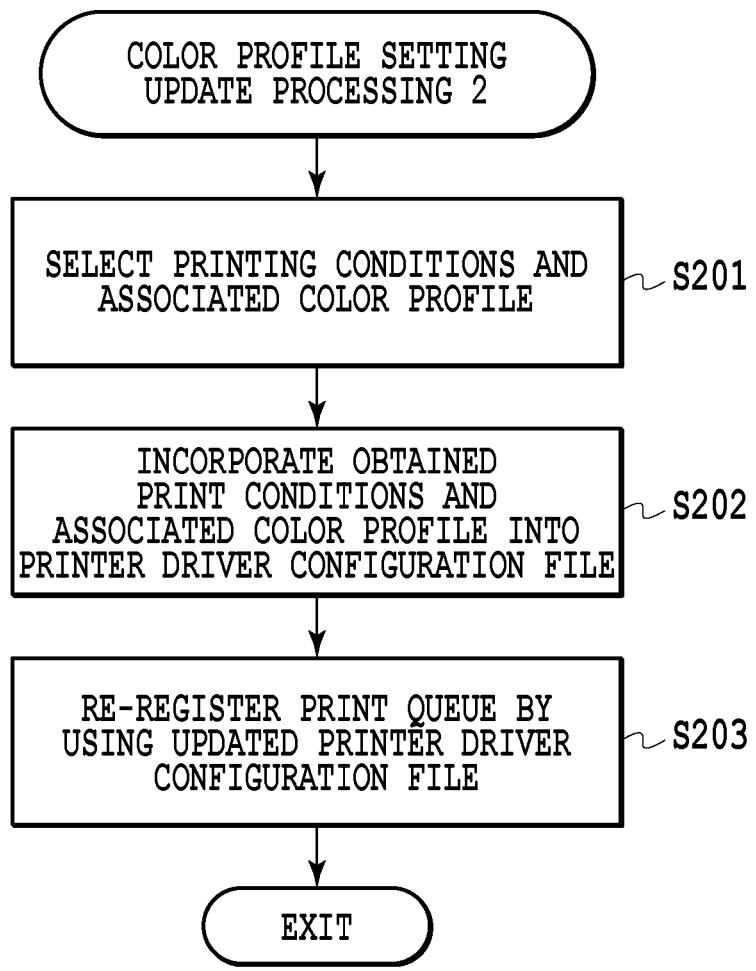
FIG. 8 is a flow chart illustrating an update process in a second embodiment.

FIG. 8 is a flow chart illustrating a process executed by the color profile setting update control unit 109 in the present embodiment. Once the process starts, the color profile setting update control unit 109, first in S201, displays a predetermined dialog, and through user inputs, obtains printing conditions and information on a color profile name associated with the printing conditions.

Figure 9A:
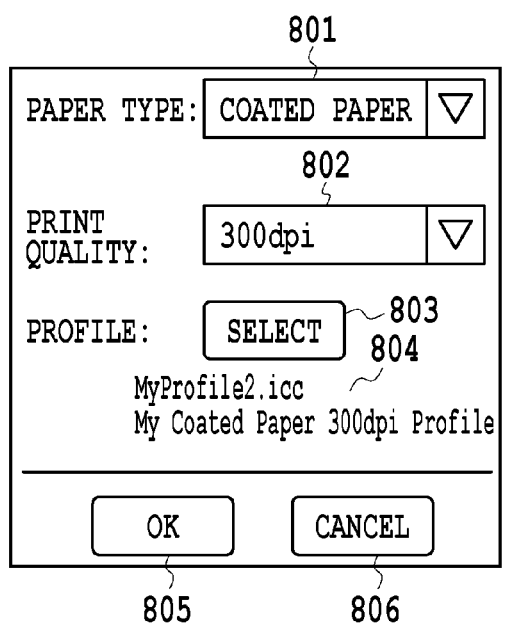
FIGS. 9A and 9B are diagrams showing dialogs displayed in the second embodiment.
Figure 9B:
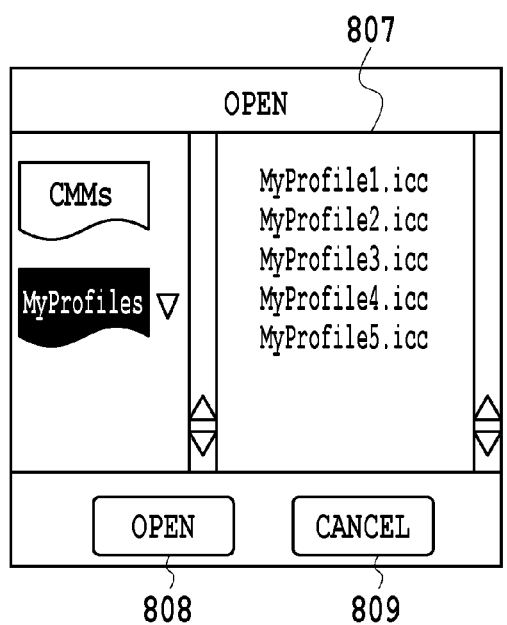

FIGS. 9A and 9B are diagrams showing dialogs displayed in S201. FIG. 9A shows a default display in which a user inputs printing conditions associated with a newly created color profile. In a combo box 801, "Paper Type" is selected. Here, "Coated Paper" is set as an example. In a combo box 802, "Print Quality" is selected. Here, "300 dpi" is set as an example. After such selection is completed, the user clicks a select button 803, and the display in the dialog switches to the state shown in FIG. 9B. In FIG. 9B, color profiles stored in a color profile storage area 106 are displayed as candidates for selection. Incidentally, color profiles added by the user, for example, may be specified and displayed as candidates.

The user selects a profile associated with printing conditions set in the combo box shown in FIG. 9A from a plurality of profile names listed in a file list 807. Here, it is assumed that <MyProfile2.icc> is set as an example. Then, an "Open" button 808 is clicked so that mapping of the printing conditions set in the combo box shown in FIG. 9A into the color profile selected from the file list 807 shown in FIG. 9B is completed. The dialog display returns to the state shown in FIG. 9A and the "File Name" and "Name" of the color profile mapped into the combination of the printing conditions set in the combo boxes are displayed on a selected profile information display column 804. Here, <MyProfile2.icc> and <My Coated Paper 300 dpi Profile> are displayed as the "File Name" and "Name," respectively. Further, if the user clicks an "OK" button 805, the mapping is completed and the dialog is closed. If a "Cancel" button 806 is clicked in the middle of the process, currently selected items become invalid and the setting dialog is closed. The process in the flow chart shown in FIG. 8 is also discontinued. If the input by the user through the dialog display is completed, the process proceeds to S202.

In S202, the color profile setting update control unit 109 incorporates the color profile selected in S201 and the mapping information created based on the settings shown in FIG. 9A into the printer driver configuration file 107 and updates the printer driver configuration file 107. FIG. 3C shows the result that the color profile setting update control unit 109 changed the mapping information in the printer driver configuration file 107 in the above example. The name <My Coated Paper 300 dpi Profile> and the file name <MyProfile2.icc> are mapped into the combination of the <CoatedPaper> key and the <300×300 dpi> key as shown in the third line.

In S203, the color profile setting update control unit 109 uses the updated printer driver configuration file 107 and re-registers a print queue specified by an application 103 to cause a printer 102 to perform printing via a printer driver 104. In a case where a print driver 104 is in use by other applications, the process proceeds in the same manner as the first embodiment. The present processing is finished.

As a result of the process shown in FIG. 8, the user can map any color profile stored in the color profile storage area 106 into printing conditions set on the display screen shown in FIG. 9A and incorporate them into the printer driver configuration file 107. Accordingly, even in a case where the user selects an OS-provided CMM 105a, color conversion can be performed by using any color profile.

Third Embodiment

In the present embodiment, the function of a color profile setting update control unit 109 is operated in a printer driver 104. Other configurations shown in FIG. 1 apply to the present embodiment like the first embodiment.

In the present embodiment, like the above-described embodiments, a new color profile can be created by a processing device 201 executing a media management application 110. By way of example, a description will be given of the case where a user uses the media management application 110 and registers a new color profile on a color profile storage area 106. Here, the file name and the name of the registered new color profile are set to <MyProfile3.icc> and <My Premium Glossy 600 dpi Profile>, respectively. At the point when the new color profile is simply registered, the content of a printer driver configuration file 107 is not changed, but default information as shown in FIG. 4A is stored. Then, the user provides a printing instruction from a menu or the like of the application which the user is currently using and starts up a print setting dialog shown in FIG. 4A.

At the print setting dialog shown in FIG. 4A, the user selects, for example, the type of paper in a paper type combo box 402 and selects a print quality in a print quality combo box 403. Next, it is assumed that the user selects <Color Matching> in the print setting menu 401, selects <OS-provided CMM> in a to-be-used CMM combo box 406 in the dialog shown in FIG. 4B, and selects a manual color profile setting in a profile combo box 407. When the user presses a print button 404 in this state, printing processing of a printer driver 104 starts accordingly, and the changing function of the printer driver configuration file 107 in the printer driver is activated.

Figure 10:
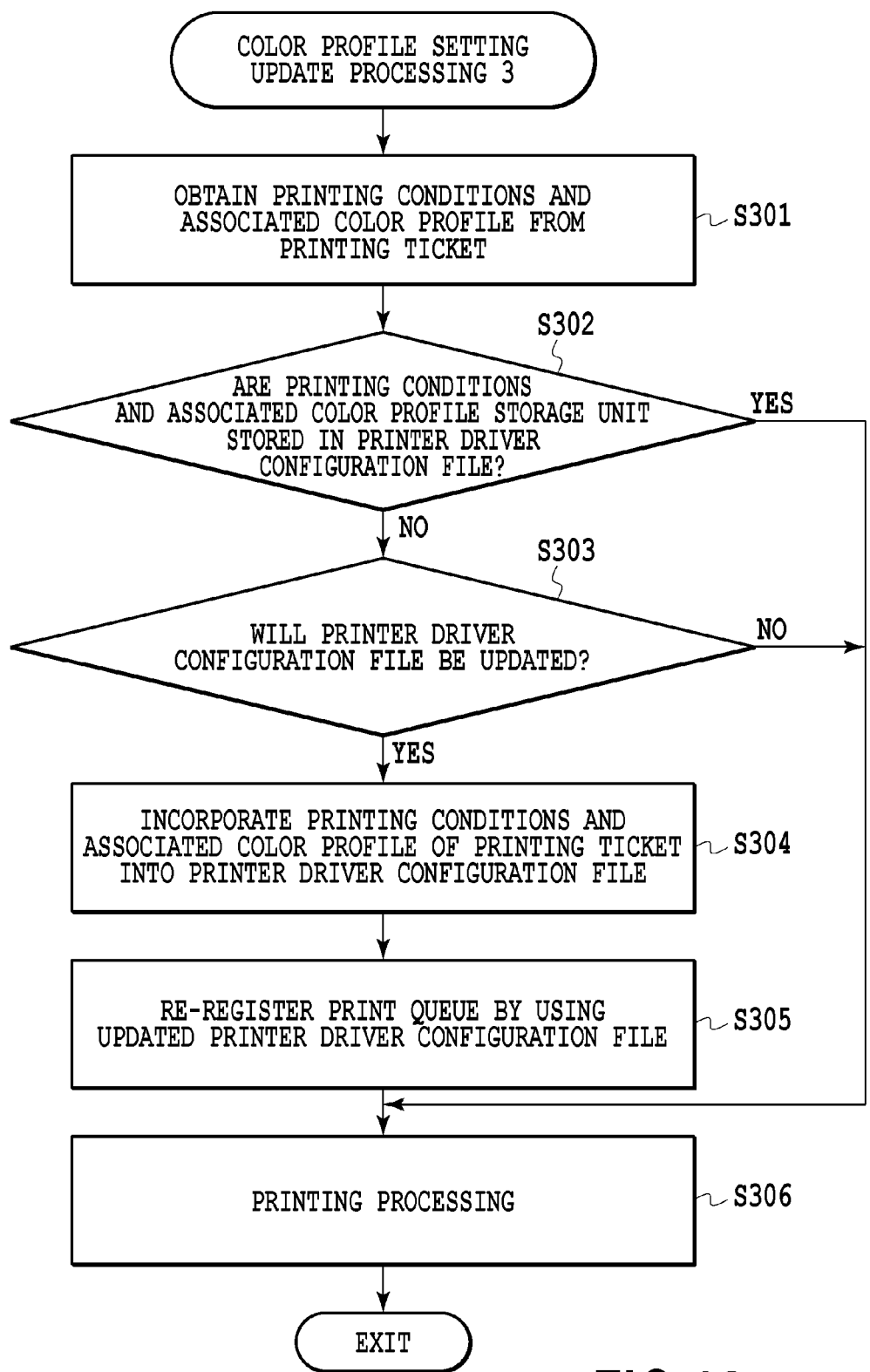
FIG. 10 is a flow chart illustrating an update process in a third embodiment.

FIG. 10 is a flow chart illustrating a process by the printer driver 104 related to updating the printer driver configuration file 107 in the present embodiment. Once the process starts, first in S301, printing conditions and color profile information desired by the user are obtained. More specifically, information on printing conditions set in each combo box in the dialog for printing as shown in FIG. 4A is obtained. Here, it is assumed that <Premium Glossy Paper> is selected in the paper type combo box 402, and <600 dpi> is selected in the print quality combo box 403. Accordingly, the printer driver obtains <PremiumGlossy> as the <Media> key and <600× 600 dpi> as the <Resolution> key. Further, here, the user selects <OS-provided CMM> in the to-be-used CMM combo box 406 in the dialog shown in FIG. 4B to apply the color profile created for the user himself. Furthermore, in a profile combo box 407, "Manual" is selected. On this occasion, a file list 807 as shown in FIG. 9B appears in the dialog. In the file list, file names of all color profiles currently stored in the color profile storage area 106 are listed, and it is assumed that the user selects a newly created <MyProfile3.icc>. As a result, the printing conditions <PremiumGlossy> and <600×600 dpi> and the color profile information <MyProfile3.icc> are obtained in S301.

In the following S302, it is confirmed whether or not the combination of the printing conditions and the color profile obtained in S301 has been stored in the current printer driver configuration file 107. If stored, the process proceeds to S306 and printing processing is executed. More specifically, color conversion is performed using the color profile obtained in S301 and print data is created. Under the already registered print queue, a printer 102 receives the print data to perform a printing operation of a color image.

Meanwhile, in a case where the combination of the printing conditions and the color profile obtained in S302 has not been stored in the current printer driver configuration file shown in FIG. 4A, the process proceeds to S303. Like the present example, in a case where the printing conditions and the color profile are <PremiumGlossy>, <600×600 dpi>, and <MyProfile3.icc>, such a combination is not described in the current printer driver configuration file shown in FIG. 4A. Therefore, the process proceeds to S303 in the present example.

Figure 11:
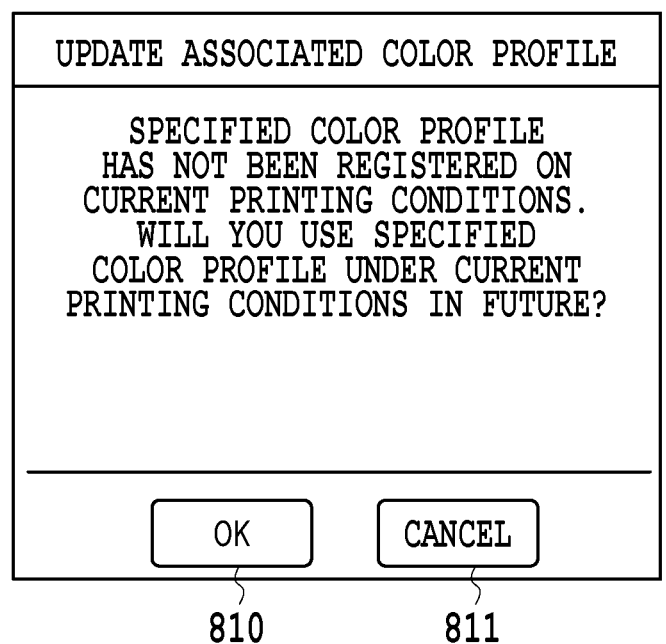
FIG. 11 is a diagram showing a dialog displayed in the third embodiment.

In S303, the dialog as shown in FIG. 11 is displayed to have the user select whether to change the printer driver configuration file. In a case where the user clicks an "OK" button 810, the process proceeds to S304 to change the printer driver configuration file. Meanwhile, in a case where the user clicks a "Cancel" button 810, the process jumps to S306. Then, color conversion is performed using the color profile obtained in S301 and print data is created. Under the already registered print queue, the printer 102 receives the print data to perform a printing operation.

In S304, the combination of the printing conditions and the color profile obtained in S301 is incorporated into the printer driver configuration file 107 and the printer driver configuration file 107 is updated. FIG. 3D shows mapping information after the printer driver configuration file 107 is changed in the above example. The file name <MyProfile3.icc> and the name <My Premium Glossy 600 dpi Profile> are mapped into the combination of the <PremiumGlossy> key and the <600× 600 dpi> key as shown in the fifth line.

In the following S305, the printer driver 104 uses the changed printer driver configuration file 107 and provides instructions to re-register a print queue that is specified by an application 103 via the printer driver 104, to cause the printer 102 to perform printing. At this timing, since the printer driver 104 is running, the print queue cannot be properly re-registered. Accordingly, in S305, the print queue is set to be re-registered after the printing operation is completed and the printer driver is released.

Further in S306, the printing processing is performed. More specifically, in a case where changing processing was performed in S305, an OS-provided CMM 105a performs color conversion using <MyProfile3.icc> and creates print data. Then, under the already registered print queue, the printer 102 receives the print data to perform a printing operation. The present processing is finished.

According to the above-described embodiments, even if a color profile is not registered in the printer driver configuration file 107 when printing is performed, the user can cause the OS-provided CMM 105a to use the color profile to perform color conversion for printing. Furthermore, the color profile is registered in the printer driver configuration file 107. Therefore, even in a case where the profile "Automatic" is selected on the display screen shown in FIG. 4B to perform printing next time under the same printing conditions, it is possible to use the color profile and cause the OS-provided CMM 105a to perform color conversion.

Incidentally, in the example of FIG. 1, a description has been given based on the color profile setting update control unit 109 which is set as a module different from the media management application 110. However, the media management application 110 may have the function of the color profile setting update control unit 109.

In the above three embodiments, descriptions have been given of the modes in which color profiles are stored and color conversion is performed in a host PC 101, with an exemplary printing system provided with the host PC 101 and the printer 102 connected to the host PC 101. However, such modes are not intended to limit the present invention. Color profiles may be managed inside a printer, or other devices connected to a network may store color profiles and perform color conversion.

Further in the above embodiments, descriptions have been given of examples in which a color profile is used in the color conversion for printing an image based on image data. However, non-limiting examples of the use of a color profile include the case where a color profile is used for display. In this case, display conditions such as a display resolution are set as output conditions of an image, and color profiles according to the display conditions are used. More specifically, color conversion is performed by an operating system or a display driver as a device driver corresponding to a display device for displaying. In this case, a color profile associated with the display conditions is used.

An image to be printed or displayed is not limited to an image created based on image data. An image may be created based on text data or vector data such as graphics.

Furthermore, in the above embodiments, descriptions have been given of examples in which a new color profile is added to the printer driver configuration file 107 as an example of updating a color profile. However, non-limiting examples of the updating of a color profile include the case where a color profile corresponding to output conditions already set in the printer driver configuration file 107 or output conditions corresponding to the already registered color profile can be changed. Even in such a case, by updating a color profile referred to by the OS-provided CMM 105a, the color profile referred to by the OS-provided CMM 105a and that by the vender-provided CMM 105b can be synchronized.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., processing device (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-005212, filed Jan. 15, 2014 which is hereby incorporated by reference wherein in its entirety.

What is claimed is:

1. An image processing apparatus that can perform color conversion on an image printed by a printer, the apparatus comprising:

a color first conversion unit configured to perform the color conversion by a device driver for the printer, using a color profile among a plurality of first profiles which are stored in a first storage portion and are associated with a plurality of print conditions of when the printer prints an image respectively;

a second color conversion unit configured to cause an operating system to perform the color conversion using a color profile among a plurality of second profile which are stored in a second storage portion and are associated with a plurality of print conditions of when the printer prints an image respectively;

a determining unit configured to determine whether a color profile corresponding to a print condition has been added to the plurality of first color profiles in the first storage portion, if a print instruction by a user is input; and a changing unit configured to, in a case where it is determined by the determining unit that the color profile has been added, change a color profile corresponding to the print condition, to the color profile which has been added to the plurality of first color profiles, in the second storage portion, even if another instruction is not input by the user after the predetermined instruction is input, a registering unit configured to register, in a case where the color profile is changed by the changing unit, a print queue which designates the color conversion of the image by the second conversion unit using the color profile after the changing and designates priming of the image, even if another instruction is not input by the user after the print instruction is input.

2. An image processing apparatus according to claim 1, wherein the print instruction is a print instruction under the print condition.

3. An image processing apparatus according to claim 2, wherein the print instruction is a print instruction designating the color conversion by the second color conversion unit.

4. An image processing apparatus according to claim 1, wherein the changing unit is activated by the device driver.

5. An image processing apparatus according to claim 1, wherein the printing condition includes a type of paper used for printing by the printer and a resolution of an image printed by the printer.

6. An image processing apparatus according to claim 1, wherein the color profile is a multi-dimensional look-up table.

7. A controlling method according to claim 1, wherein the printing condition includes a type of paper used for printing by the printer and a resolution of an image printed by the printer.

8. A non-transitory computer readable storage medium storing a program for causing a computer to function as units in the image processing apparatus according to claim 1.

9. An image processing apparatus according to claim 1, wherein one storage unit includes the first storage portion and the second storage portion.

10. An image processing apparatus according to claim 1, further comprising, a print control unit configured to cause a printer to print a test pattern in accordance with the output condition; and an adding unit configured to generates a color profile corresponding to the output condition, based on a result of measuring of the printed test pattern by a colorimeter, and to add the generated color profile to the plurality of first color profiles.

11. An image processing apparatus according to claim 1, further comprising:

a deletion unit configured to delete a print queue which corresponds to the output condition and the color profile before the changing by the changing unit and is registered by the print instruction, even if another instruction is not input by the user after the predetermined instruction is input; and wherein the registering unit re-registers a print queue, using the color profile after the changing by the changing unit.

12. A controlling method of an image processing apparatus that can perform color conversion on an image printed by a printer, the apparatus comprising:

a color first conversion unit configured to perform the color conversion by a device driver for the output device, using a color profile among a plurality of first profiles which are stored in a first storage portion and are associated with a plurality of output conditions of when the output device outputs an image respectively; and a second color conversion unit configured to cause an operating system to perform the color conversion using a color profile among a plurality of second profile which are stored in a second storage portion and are associated with a plurality of output conditions of when the output device outputs an image respectively, the method comprising:

a determining step of determining whether a color profile corresponding to a print condition has been added to the plurality of first color profiles in the first storage portion, if a print instruction by a user is input;

a changing step for, in a case where it is determined in the determining that a color profile has been added, changing a color profile corresponding to the print condition, to the color profile which has been added to the plurality of first color profiles, in the second storage portion, even if another instruction is not input by the user after the predetermined instruction is input; and a registering step of registering, in a case where the color profile is changed in the changing step, a print queue which designates the color conversion of the image by the second conversion unit using the color profile after the changing and designates printing of the image, even if another instruction is not input by the user after the print instruction is input.

13. A controlling method according to claim 12, the print instruction is a print instruction under the print condition.

14. An image processing apparatus according to claim 13, wherein the print instruction is a print instruction designating the color conversion by the second color conversion unit.

15. A controlling method according to claim 12, wherein the changing step is activated by the device driver.

16. A controlling method according to claim 12, wherein the color profile is a multi-dimensional look-up table.

17. A controlling method according to claim 12, wherein one storage unit includes the first storage portion and the second storage portion.

18. A controlling method according to claim 12, further comprising:

a print control step of causing a printer to print a test pattern in accordance with the output condition; and an adding step of generating a color profile corresponding to the output condition, based on a result of measuring of the printed test pattern by a colorimeter, and of adding the generated color profile to the plurality of first color profiles.

19. A controlling method according to claim 12, further comprising:
  a deletion step of deleting a print queue which corresponds to the output condition and the color profile before the changing in the changing step and is registered by the print instruction, even if another instruction is not input by the user after the predetermined instruction is input; and
  wherein the registering step re-registers the print queue, using the color profile after the changing in the changing unit.

* * * * *